(12) United States Patent  
Heckmann, Jr.

(10) Patent No.: US 6,644,975 B2  
(45) Date of Patent: Nov. 11, 2003

(54) KEYBOARD GUIDE

(76) Inventor: Bernard E. Heckmann, Jr., P.O. Box 19818, Reno, NV (US) 89511

( * ) Notice: Subject to any disclaimer, the term of this patent is extended or adjusted under 35 U.S.C. 154(b) by 0 days.

(21) Appl. No.: 10/086,219

(22) Filed: Oct. 19, 2001

(65) Prior Publication Data

US 2003/0077554 A1 Apr. 24, 2003

(51) Int. Cl.⁷ .............................................. G09B 13/04
(52) U.S. Cl. ........................................................ 434/227
(58) Field of Search ................................. 434/227, 228, 434/229, 230, 231, 232, 233; D18/12, 12.2; D19/59, 62

(56) References Cited

U.S. PATENT DOCUMENTS

| 918,283 | A | | 4/1909 | Chrisman |
|---|---|---|---|---|
| 1,328,818 | A | | 1/1920 | Butler et al. |
| 1,377,070 | A | | 5/1921 | Helguera |
| 1,572,385 | A | | 2/1926 | Ellsworth |
| 1,687,904 | A | * | 10/1928 | Larson ....................... 400/488 |
| 3,161,967 | A | | 12/1964 | Siegel |
| 3,229,800 | A | | 1/1966 | Krag |
| D242,877 | S | | 12/1976 | Bologna |
| 4,075,465 | A | | 2/1978 | Funk et al. |
| D300,040 | S | * | 2/1989 | Dermody ..................... D18/12 |
| 4,902,231 | A | | 2/1990 | Freer |
| 5,269,689 | A | * | 12/1993 | Hill ............................. 434/227 |
| 5,286,125 | A | | 2/1994 | DiGiosia |
| 5,419,704 | A | | 5/1995 | North |
| 5,626,429 | A | | 5/1997 | Choate |
| 5,709,550 | A | | 1/1998 | Devine |
| D395,450 | S | * | 6/1998 | Drumm et al. ............... D19/59 |
| 5,790,053 | A | | 8/1998 | Chang |
| 5,938,353 | A | | 8/1999 | Butler |

* cited by examiner

*Primary Examiner*—Derris H. Banks  
*Assistant Examiner*—Kurt Fernstrom  
(74) *Attorney, Agent, or Firm*—Michael W. Starkweather

(57) ABSTRACT

A keyboard guide is disclosed herein having a substantially rectangular frame. The frame has a front and back wall interconnected by two side walls. The guide also includes at least one divider, coupled between the front and back wall, having a top edge leaning toward the side wall that is closest thereto, to form an angle with respect to a vertical orientation. The keyboard guide may also include at least one indicator, positioned on the divider, to indicate a key location. In one embodiment, the indicator is a bump on a side of the divider. The keyboard guide may also include a central divider, coupled between the front and back walls, having a substantially vertical orientation along a top and bottom edge. The guide may also include right-side and left-side dividers, on opposite sides of the central divider respectively.

33 Claims, 4 Drawing Sheets

KEYBOARD GUIDE

RELATED APPLICATIONS

The following application is being filed concurrently herewith on this 19$^{th}$ day of Oct., 2001, and is hereby incorporated by reference:

| Title | Express Mailing Label No. | Ser. No. |
|---|---|---|
| A Keyboard Training Device | EV 003752052 US | 29/151,177 |

FIELD OF THE INVENTION

The present invention relates generally to a keyboard guide for assisting users in locating keys on a keyboard, and more particularly to a keyboard guide that is easily installed and removed, that accommodates the various sizes of different fingers, that positions a typist's fingers in a more natural and comfortable position, and does not significantly interfere with the keys when in use.

BACKGROUND

In today's PC dominated world, typing skills are more critical than ever. In the past, it was only a relatively small number of individuals who needed fast typing skills—e.g. secretaries, journalists, etc. However, the ubiquitous nature of PCs—at home or office-now requires that numerous people improve their ability to input data in order to maximize efficiency, and economy of time.

In learning the touch system of typing, it is necessary to train oneself to strike the appropriate key without looking down at the keyboard. To facilitate this training, keyboards have what is known as the "home key row" or the "home keys" around which groups of keys are referenced. For example, the finger that strikes the "k" key (which is a home key in the QWERTY keyboard layout) would also strike the "i" and "," keys. Training one's fingers to remain in the proper key group requires great effort, and there has been a substantial amount of invention relating to this sort of training.

A variety of earlier U.S. patents disclose various means and methods for learning the touch typing system. For example, U.S. Pat. No. 5,286,125 to DiGiosia discloses a keyboard and key guide frame arrangement. U.S. Pat. No. 4,902,231 to Freer discloses a mnemonic device for learning how to type, and methods of constructing and utilizing the device. U.S. Pat. No. 5,419,704 to North discloses a keyboard cover. U.S. Pat. No. 5,709,550 to Devine discloses a keyboard training apparatus. U.S. Pat. No. 4,075,465 to Funk et al. discloses a keyboard overlay. U.S. Pat. No. Des. 395,450 to Drumm et al. discloses an ornamental design for a keyboard training device. U.S. Pat. No. Des. 300,040 to Dermody discloses an ornamental design for a keyboard guide. U.S. Pat. No. 3,229,800 to Krag discloses a teaching attachment for typewriters. U.S. Pat. No. 3,161,967 to Siegel et al. discloses a method and apparatus for self teaching and practice of touch typing. U.S. Pat. No. 1,572,385 to Ellsworth discloses a finger guide for typewriters. U.S. Pat. No. 1,377,070 to Helguera discloses a keyboard finger guide. U.S. Pat. No. 1,687,904 to Larsen et al. discloses a typewriter keyboard. U.S. Pat. No. 918,283 to Chrisman discloses a typewriter. Each of these patents is hereby incorporated by reference for its supporting teachings.

While the foregoing patents demonstrate improvement in the area of typing instruction, they are either overly cumbersome in their application, or uneconomical, or do not adequately provide for the comfort of the typist.

SUMMARY OF THE INVENTION

There is, therefore, provided a keyboard guide that is easily installed and removed, that accommodates the various sizes of different fingers, that positions a typist's fingers in a more natural and comfortable position, and does not significantly interfere with the keys when in use.

The keyboard guide includes a substantially rectangular frame. The frame has a front and back wall interconnected by two side walls. The guide also includes at least one divider, coupled between the front and back wall, having a top edge leaning toward the side wall that is closest thereto, to form an angle with respect to a vertical orientation.

The keyboard guide may also include at least one indicator, positioned on the divider, to indicate a key location. In one embodiment, the indicator is a bump on a side of the divider.

The keyboard guide may also include a central divider, coupled between the front and back walls, having a substantially vertical orientation along a top and bottom edge. The guide may also include right-side and left-side dividers, on opposite sides of the central divider respectively.

In one embodiment, the angle of the divider is substantially uniform for all of the dividers. In other embodiments, the angle of the divider toward the closest side wall increases corresponding to proximity to the closest side wall.

In one embodiment, the number of dividers is seven, having three right-side and three left-side dividers and one central divider, In one embodiment, the front wall has a first height and the side and back walls have a second height that is greater than the first height. Moreover, the top edge of the side walls may be substantially flush with the top edge of the front and back walls.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION OF THE PREFERRED EMBODIMENT(S)

The presently preferred embodiments of the invention will be best understood by reference to the drawings, wherein like parts are designated with like numerals throughout.

Figure 1:
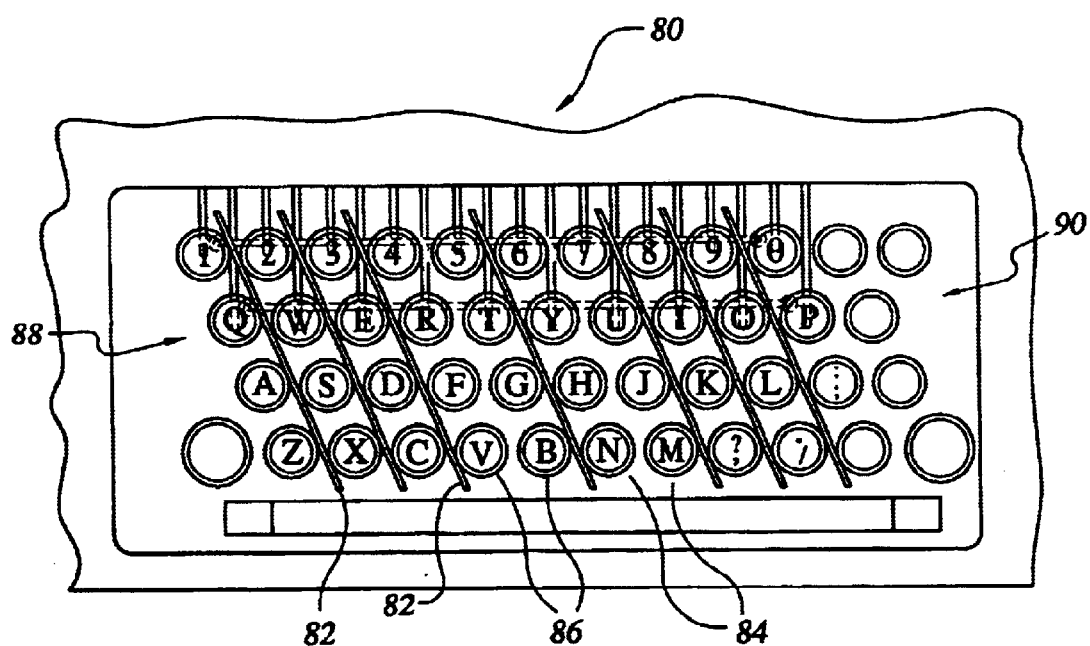
FIG. 1 is a depiction of a prior art typing guidance system.

FIG. 1, is a depiction of a prior art keyboard guide apparatus 80 having seven blades 82 defining six channels 84 and two end-groups of keys 88, 90. Each of the blades 82 is configured at an angle such that the keys 86 are grouped according to proper touch-typing fingering. Specifically, each channel 84 and end-group 88, 90 encloses a particular group of keys 86 that are operated by a common finger.

Figure 2:
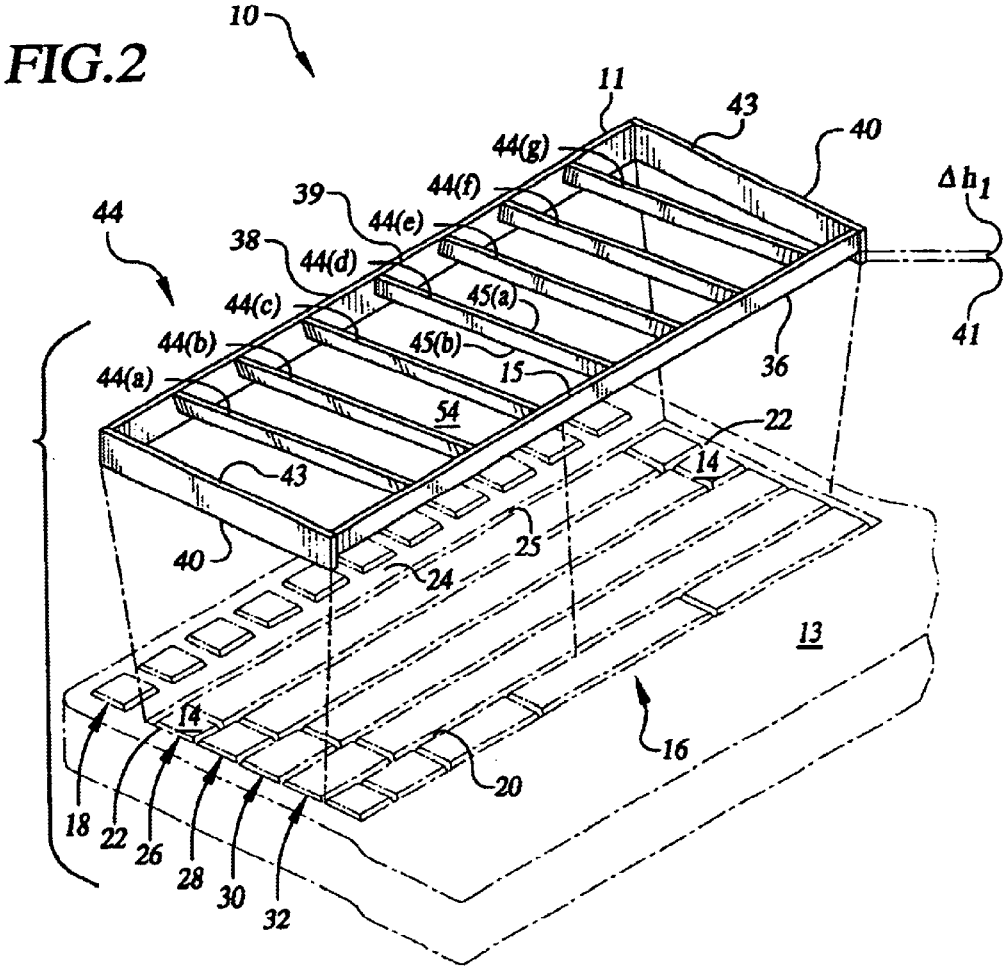
FIG. 2 is an oblique elevational perspective view of an embodiment of a keyboard guide according to the present invention.

In FIG. 2 is shown one embodiment of a keyboard guide 10 according to the present invention. The keyboard guide 10, is shown having a substantially rectangular frame 11 partitioned by dividers 44. In the embodiments shown in FIGS. 2–9, the guide 10 has seven dividers 44(a)–(g), coupled between the front 36 and back 38 wall of the frame 11. These dividers 44, in conjunction with the side walls 40, form channels of varying width 54.

Figure 6:
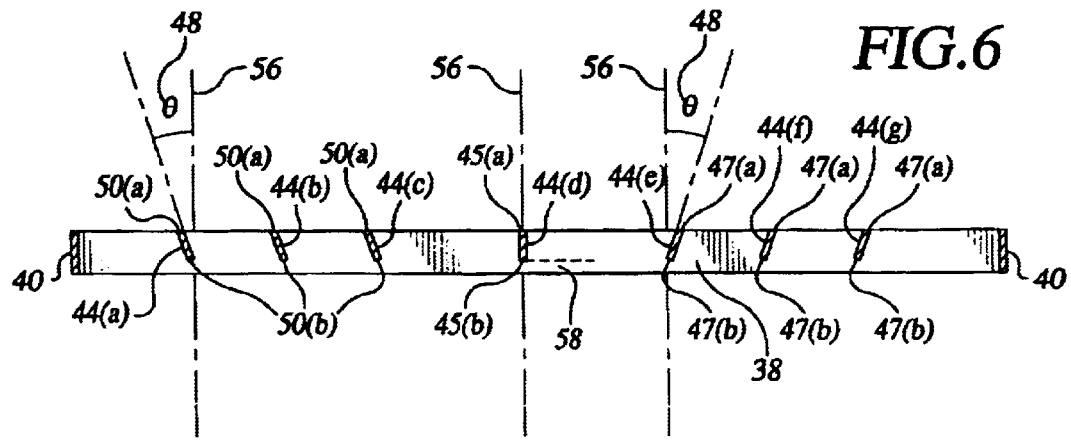
FIG. 6 is a sectional view taken along line 6—6 in FIG. 5.
Figure 7:
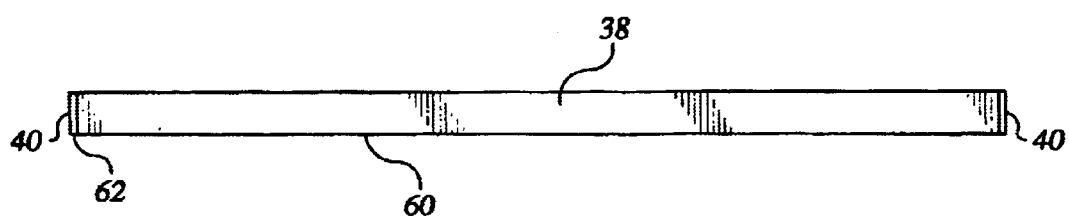
FIG. 7 is a back view of the keyboard guide in FIG. 5.
Figure 8:
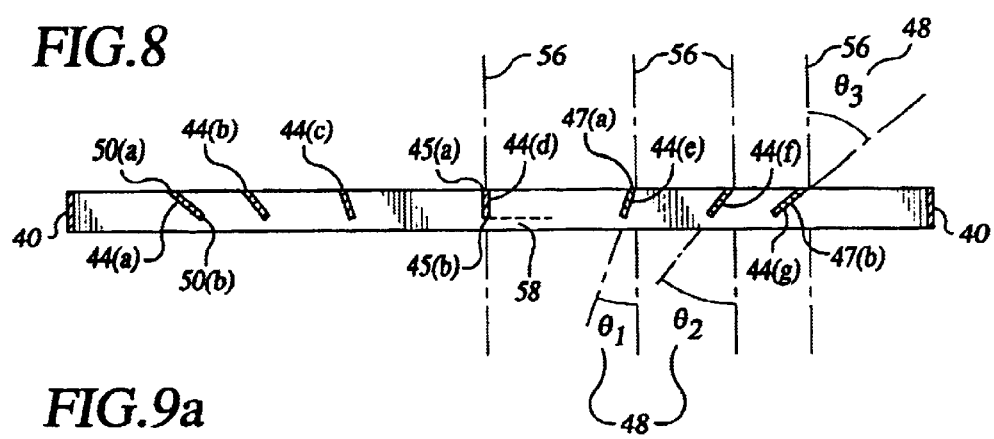
FIG. 8 is a sectional view of another embodiment of a keyboard guide according to the present invention.
Figure 9A:
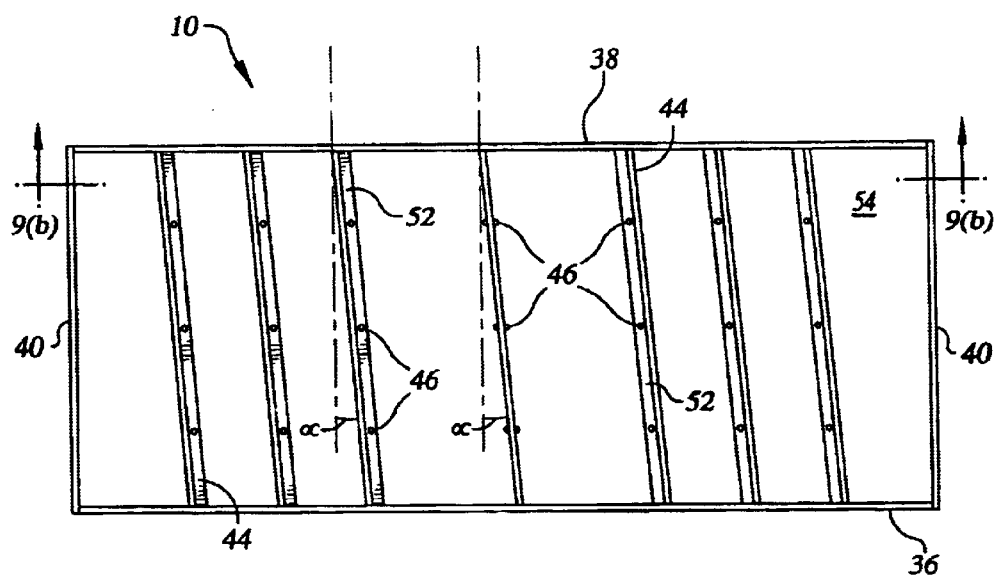
FIG. 9(a) is a top plan view of yet another embodiment of a keyboard guide according to the present invention.
Figure 9B:
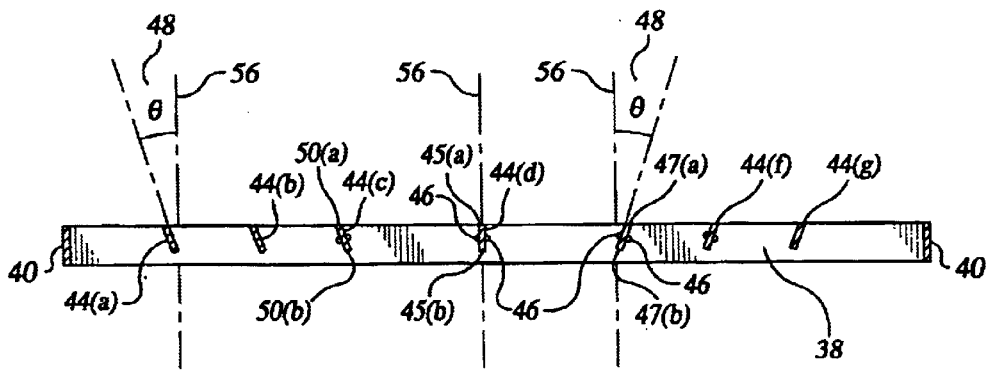
FIG. 9(b) is a sectional view taken along line 9(b)—9(b) in FIG. 9(a).

As best seen in FIGS. 6, 8 and 9(b), the dividers 44 can be grouped into three categories: a central divider 44(d), right-side dividers 44(e)–(g) and left-side dividers 44(a)–(c). The central divider 44(d) has a substantially vertical orientation along a top 45(a) and bottom 45(b) edge. The right 44(e)–(g) and left 44(a)–(c) dividers are typically angularly oriented with a top edge (47(a) and 50(a) respectively) leaning away from the central divider 44(d) (or, in embodiments not having a central divider 44(d), the top edge 47(a) and 50(a) of the right 44(e)–(g) and left dividers 44(a)–(c) lean toward the side wall 40 closest thereto). The right 44(e)–(g) and left dividers 44(a)–(c) form an angle (noted as θ in FIGS. 6 and 9(b)) 48 with respect to a vertical orientation 56. By having the right 44(e)–(g) and left side dividers 44(a)–(c) at an angle 48, the keyboard guide 10 of the present invention positions the typist's fingers in a much more comfortable and natural arrangement—with the fingers oriented towards the center of the keyboard 12.

As seen in FIG. 6, the angles 48 of the right 44(e)–(g) and left 44(a)–(c) dividers can be substantially uniform. Specifically, each of the right 44(e)–(g) and left 44(a)–(c) dividers leans away from the central divider 44(d) (or toward the closest side wall 40) to form approximately the same angle (θ) 48, with respect to a vertical axis 56.

As seen in FIG. 8, in an alternative embodiment, the angles 48 of the right 44(e)–(g) and left 44(a)–(c) dividers can vary. For example, in the embodiment shown in FIG. 8, the dividers still lean away from the central divider 44(d) (or toward the closest side wall 40) to form an angle 48, but the angles increase corresponding to proximity to the closest side wall 40. These increasing angles 48 are denoted by Φ1, Φ2 and Φ3, with Φ1 being the smallest angle and Φ3 being the largest angle with respect to the vertical axis 56.

In one embodiment of the present invention, the angles 48 created by the innermost right 44(e) and left-side dividers 44(c) are approximately 0–15 degrees, with a preferred orientation at approximately 10 degrees; the angles 48 created by dividers 44(b) and 44(f) are approximately 5–25 degrees, with a preferred orientation at approximately 15 degrees; and the angles 48 created by dividers 44(a) and 44(g) are approximately 10–35 degrees, with a preferred orientation at approximately 20 degrees.

Figure 3:
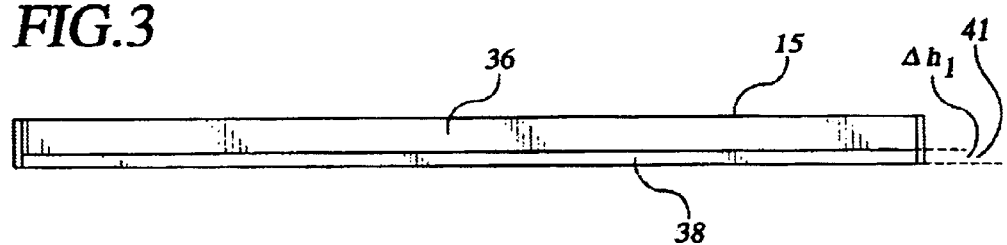
FIG. 3 is a front view of the keyboard guide in FIG. 2.
Figure 4:
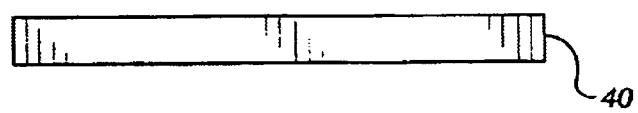
FIG. 4 is a side view of the keyboard guide in FIG. 2.

In FIGS. 2 and 3, the front wall 36 is shown having a height that is less than the height of the back 38 and side walls 40 by an amount $\Delta h_1$ (41 in FIGS. 2 and 3). In this embodiment, the top edge 15 of the front wall 36 is substantially flush with the top edges 43, 39 of the side 40 and back 38 walls. As seen in FIGS. 2, 3, 6 and 8, the dividers 44 also have a height that is less than the back 38 and side walls 40. Thus, there is a space between the bottom edges 45(b), 47(b), 50(b) of the dividers 44 and the keys 14.

In FIGS. 6 and 8, the central divider 44(d) is shown as having a height that is less than the height of the side 40 and back walls 38 by $\Delta h_2$ (reference number 58 in FIGS. 6 and 8). In these embodiments, the adjacent right 44(e)–(g) and left side dividers 44(a)–(c), are of the same height as the central divider 44(d). Thus, as is apparent from the figures, the space between the bottom edges 47(b) and 50(b) of the right 44(e)–(g) and left side dividers 44(a)–(c) and the keys 14 will vary depending on the angle 48 of the right 44(e)–(g) and left side dividers 44(a)–(c) with respect to a vertical axis 56.

The variations in height between the frame walls 36, 38 and 40 and the dividers 44 allow the frame 11 to fit substantially over the keys 14 on the keyboard 12, without having the dividers 44 directly contact the keys 14. In this manner, the keys 14 are not significantly interfered with when the keyboard guide 10 is in place.

As seen in FIGS. 9(a) and 9(b), indicators 46, may be positioned on a side 52 of the dividers 44, to indicate a key 14 location. These indicators help the typist identify which row 26, 28, 30, 32 (as seen in FIG. 2) his finger is currently on within the channel 54. These indicators can be bumps, ridges, recesses, or any other anomaly on the side 52 of the divider 44 that could be sensed by the typists fingers.

Figure 5:
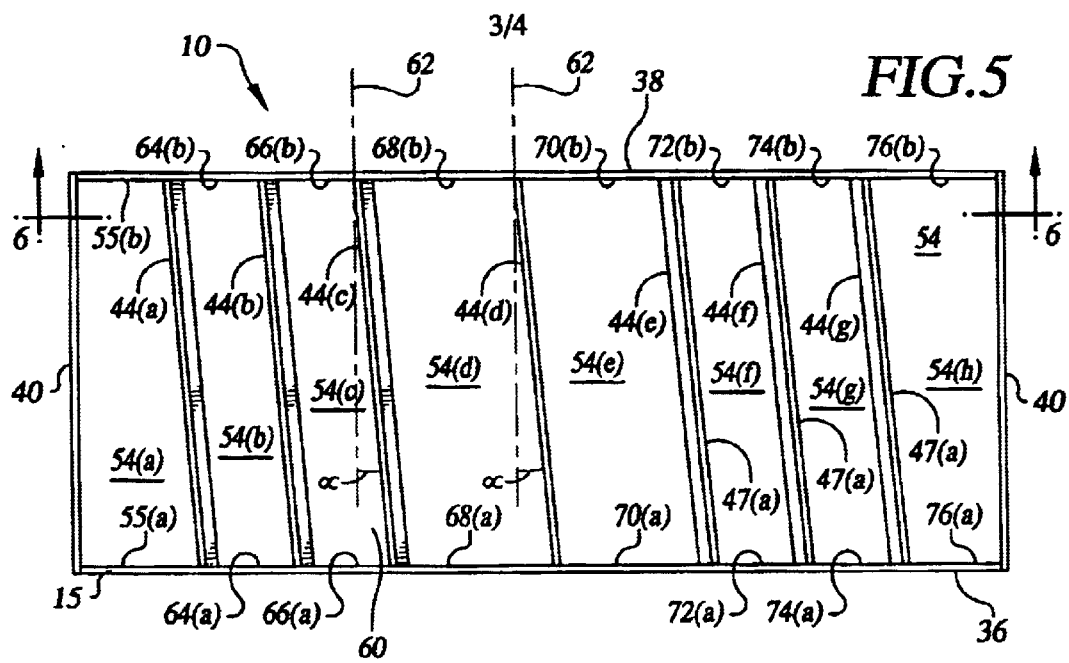
FIG. 5 is a top plan view of an embodiment of a keyboard guide according to the present invention.

As best seen in FIG. 5, channels of varying width 54, defined by the dividers 44, are better able to accommodate the varying widths of the typist's fingers. For example, channels 54(c) and 54(f) are wider than channels 54(b) and 54(g). This varying width corresponds to the typical difference in width between a typist's middle and ring finger.

In one embodiment, channel 54(a) is approximately 2 8/16 inches at its front edge 55(a) (FIG. 5), and approximately 1 9/16 inches at its back edge 55(b). Channels 54(b) and 54(g) are approximately 12/16 inches at their front 64(a), 74(a) and back edges 64(b), 74(b). Channels 54(c) and 54(f) are approximately 14/16 inches at their front 66(a), 72(a) and back edges 66(b), 72(b). Channels 54(d) and 54(e) are approximately 1 7/16 inches at their front 68(a), 70(a) and back 68(b), 70(b) edges. Channel 54(h) is approximately 2 10/16 inches at its front edge 76(a), and approximately 3 12/16 inches at its back edge 76(b).

It is noted that the dividers 44 are at an angle (α) 60 with respect to axis 62, such that the keys 14 are grouped according to proper touch-typing fingering. Specifically, each channel 54 encloses a particular group of keys 14 that are operated by a common finger. For example, in one embodiment, the key grouping is substantially the same as that disclosed in FIG. 1. However, it is noted that the angle 60 can vary as the guide 10 is used with keyboards of different types and sizes.

Moreover, while the QWERTY keyboard layout is given as one example, the present invention is well suited for non-QWERTY keyboard layouts (e.g. DVORAK) and is also suitable for keyboards having non-english characters.

It is also noted that a variety of materials could be used in constructing the present invention. These materials include, but are not limited to, plastic, cardboard, lightweight metals, or any combination thereof.

It is also noted that when used herein, the term "keyboard" is considered to include both typewriters and computer keyboards, as well as any other key driven, data input devices utilizing a similar key configuration.

Variations of the Invention

In the embodiment depicted in FIGS. 2–9(b), seven dividers 44 are used. However, it is noted that there is no particular requirement for there to be seven dividers 44 in order for the present invention to function. For example, it may be desirable to initially construct the keyboard guide 10 with fewer than seven dividers 44 to improve typing skills in two or three fingers. Alternatively, it may be desirable, as one becomes a more skilled typist, to have the dividers 44 sequentially removable. Therefore, the use of seven dividers is only given as one embodiment, and is in no way intended to limit the present invention to that particular embodiment.

The dividers 44 are shown in the figures as being substantially of a uniform height. For example, in one embodiment, the dividers 44 are at least approximately 3/16 inches in height. However, the dividers 44 could be different heights. For example, in FIG. 8, the height of adjacent dividers 44 could vary such that the distance between the bottom edges 45(b), 47(b), 50(b) of the dividers 44 and the keys 14 is the same for all the dividers 44, in spite of their varying angular orientation.

It is also noted that the dividers 44 could have a different ornamental design than is shown in FIGS. 2–9(b). For example, the dividers 44 could have wave-like crests and troughs running along their top 45(a), 47(a), 50(a) and/or bottom edges 45(b), 47(b), 50(b). Likewise the top and bottom edges of the side 40, back 38 and front walls 36 could have similar variations in ornamental design. However, as would be apparent to one skilled in the art, such ornamental changes would need to be consistent with the intended operation of the keyboard guide 10, as discussed above.

In FIG. 2, the back wall 38 of the frame 11 is shown resting on the protective face 13 of the keyboard 12 between the function key row 18 and the top row of characters 26. The side walls 40 likewise rest on the protective face 13 of the keyboard 12, and the front wall 36 is positioned substantially above the recess 20 between the space bar row 16 and the bottom row of characters 32. However, it is noted that the actual position of the keyboard guide 10 can vary between embodiments. For example, the frame 11 can be configured such that the side walls 40 are seated within the recess 22 between the keys 14 and the protective face 13 of the keyboard 12. The frame 11 can also be configured such that the back wall 38 rests in the recess 25 between the top row of characters 26 and the protective face 13 of the keyboard 12. The front wall 36 can also be positioned at varying depths in the recess 20 between the space bar row 16 and the bottom row of characters 32.

The thickness of the frame 11, could also vary depending on where on the keyboard 12 the frame 11 rests. In one embodiment, the frame is approximately 3/32 inches thick on its back 38 and side walls 40 and 1/32 inches thick on its front wall 36. In another embodiment, where the frame 11 rests in the recesses 20, 22, 25 between the keys 14 and the protective face 13 (or between adjacent keys 14), the thickness of the frame 11 is approximately 1/32 inches. In another embodiment, wherein the frame 11 rests on the protective face 13 of the keyboard 12, the thickness of the frame 11 is approximately 1/32 to 1/16 inches.

Each of these modifications can be accomplished without significantly interfering with the typist's ability to strike a particular key 14.

Application of the keyboard guide with split or ergonomic keyboards is also considered to be within the scope of the present invention. For example, in one embodiment, the keyboard guide 10 is divided into two component frames—each of the component frames enclosing a group of keys on the split keyboard (e.g. the keys on the right side of the split keyboard would be enclosed in one frame, and the keys on the left side of the keyboard would be enclosed in another frame). Functioning similar to the embodiments discussed above, each component frame has a front wall 36 and a back wall 38 connected by either side walls 40 or one or more dividers 44 suspended above the keys 14. It is also noted that in such an embodiment, the overall shape of the component frames will be non-rectangular.

Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, form, function, manner of operation and use may be made without departing from the principles and concepts set forth herein.

What is claimed is:

1. A keyboard guide, for assisting users in locating keys on a keyboard, comprising:
   a) a substantially rectangular frame, having:
      i) a front wall having a first height and a first top edge;
      ii) a back wall having a second height that is greater than the first height, and a second top edge; and
      iii) two side walls, each having a third and fourth top edge respectively, interconnecting the front and back walls, such that the top edges of the side walls are substantially flush with the top edges of the front and back walls;
   b) a central divider, coupled to the front and back walls, having a substantially vertical orientation along a top edge of the central divider and a bottom edge of the central divider;
   c) at least one right-side divider, coupled to the front and back walls, where the at least one right-side divider is on a right side of the central divider, and the at least one right-side divider has a first leaning top edge that forms a first angle away from the central divider;
   d) at least one left-side divider, coupled to the front and back walls, where the at least one left-side divider is on a left side of the central divider, and the at least one left-side divider has a second leaning top edge that forms a second angle away from the central divider; and
   e) at least one indicator, positioned on a side of at least one divider, to indicate a key location.

2. The keyboard guide of claim 1, wherein the indicator is a bump.

3. The keyboard guide of claim 1, wherein the first and second angles of the dividers, increases corresponding to a distance between the right-side and left-side dividers and the central divider.

4. The keyboard guide of claim 1, wherein the first and second angles of the dividers, is substantially uniform for all the right-side and left-side dividers.

5. The keyboard guide of claim 1, wherein the right-side, left-side and central dividers define channels of varying width corresponding to use with a particular finger.

6. The keyboard guide of claim 1, wherein a space exists between a bottom edge of the right-side, left-side and central dividers and the keys.

7. A keyboard guide, for assisting users in locating keys on a keyboard, comprising:
 a) a substantially rectangular frame, having a vertically oriented front and back wall interconnected by two vertically oriented side walls; and
 b) at least one divider, coupled between the front and back wall, having a top edge leaning toward the respective vertically oriented side wall that is closest thereto, to form an angle with respect to the vertically oriented side wall.

8. The keyboard guide of claim 7, wherein the frame is dimensioned to fit substantially over the keys on the keyboard.

9. The keyboard guide of claim 7, further comprising at least one indicator, positioned on the at least one divider, to indicate a key location.

10. The keyboard guide of claim 9, wherein the indicator is a bump on a side of the divider.

11. The keyboard guide of claim 7, further comprising a central divider, coupled between the front and back walls, having a substantially vertical orientation along a top and bottom edge of the central divider.

12. The keyboard guide of claim 7, wherein the angle of the divider toward the closest side wall increases corresponding to proximity to the closest side wall.

13. The keyboard guide of claim 7, wherein the angle of the divider is substantially uniform for all of the dividers.

14. The keyboard guide of claim 11, wherein the at least one divider further comprises at least one right-side divider and at least one left-side divider, on opposite sides of the central divider respectively.

15. The keyboard guide of claim 14, wherein the number of dividers is seven, having three right-side and three left-side dividers and one central divider.

16. The keyboard guide of claim 7, wherein the front wall has a first height and the side and back walls have a second height, the second height being greater than the first height.

17. The keyboard guide of claim 16, wherein a top edge of the side walls is substantially flush with a top edge of the front and back walls.

18. The keyboard guide of claim 7, wherein a space exists between a bottom edge of the right-side, left-side and central dividers and the keys.

19. A keyboard guide, for assisting users in locating keys on a keyboard, comprising:
 a) a frame, having a front and back wall, and a first and second side wall interconnecting the front and back;
 b) a first divider, coupled between the front and back walls, closer to the first side wall than to the second side wall, and having a first top edge positioned toward the first side wall at a first angle; and
 c) a second divider, coupled between the front and back walls, closer to the first side wall than the first divider, and having a second top edge positioned toward the first side wall at a second angle that is greater than the first angle.

20. The keyboard guide of claim 19, further comprising:
 a) a third divider, coupled between the front and back walls, closer to the second side wall than to the first side wall, and having a third top edge positioned toward the second side wall at a third angle; and
 b) a fourth divider, coupled between the front and back walls, closer to the second side wall than the third divider, and having a fourth top edge positioned toward the second side wall at a fourth angle that is greater than the third angle.

21. The keyboard guide of claim 20, further comprising a fifth divider, coupled between the front and back walls, closer to the second side wall than the fourth divider, and having a fifth top edge positioned toward the second side wall at a fifth angle that is greater than the fourth angle.

22. The keyboard guide of claim 21, further comprising a sixth divider, coupled between the front and back walls, closer to the first side wall than the second divider, and having a sixth top edge positioned toward the first side wall at a sixth angle that is greater than the second angle.

23. The keyboard guide of claim 22, further comprising a central divider, coupled with the front and back walls, between the first dan third divider, having a substantially vertical orientation along a top and bottom edge of the central divider.

24. The keyboard guide of claim 20, wherein the first and third angles are approximately 0–15 degrees.

25. The keyboard guide of claim 20, wherein the second and fourth angles are approximately 5–25 degrees.

26. The keyboard guide of claim 22, wherein the fifth and sixth angles are approximately 10–35 degrees.

27. The keyboard guide of claim 19, wherein the frame is dimensioned to fit substantially over a group of keys on a keyboard.

28. The keyboard guide of claim 19, further comprising at least one indicator, positioned on at least one divider, to indicate a key location.

29. The keyboard guide of claim 28, wherein the indicator is a bump on a side of the divider.

30. The keyboard guide of claim 19, wherein the dividers define channels of varying width corresponding to use with a particular finger.

31. The keyboard guide of claim 19, wherein the front wall has a first height and the side and back walls have a second height, the second height being greater than the first height.

32. The keyboard guide of claim 31, wherein a top edge of the side walls is substantially flush with a top edge of the front and back walls.

33. The keyboard guide of claim 19, wherein a space exists between a bottom edge of the right-side, left-side and central dividers and the keys.

* * * * *